United States Patent
Finkenzeller et al.

(10) Patent No.: US 8,360,921 B2
(45) Date of Patent: *Jan. 29, 2013

(54) DIFFERENTIAL

(75) Inventors: Eva-Maria Finkenzeller, Gengenbach (DE); Renald Kuempel, Herpf (DE); Kathrin Fuchs, Steinach (DE)

(73) Assignee: Neumayer Tekfor Holding GmbH, Hausach (DE)

(*) Notice: Subject to any disclaimer, the term of this patent is extended or adjusted under 35 U.S.C. 154(b) by 0 days.

This patent is subject to a terminal disclaimer.

(21) Appl. No.: 13/410,364

(22) Filed: Mar. 2, 2012

(65) Prior Publication Data

US 2012/0190494 A1 Jul. 26, 2012

Related U.S. Application Data

(63) Continuation of application No. PCT/DE2010/000938, filed on Aug. 6, 2010.

(30) Foreign Application Priority Data

Sep. 2, 2009 (DE) .......................... 10 2009 039 753
Nov. 26, 2009 (DE) .......................... 10 2009 055 867

(51) Int. Cl.
*F16H 48/06* (2006.01)

(52) U.S. Cl. .................. 475/230; 74/665 GB

(58) Field of Classification Search .................. 475/230, 475/248; 74/665 GA, 665 GB
See application file for complete search history.

(56) References Cited

U.S. PATENT DOCUMENTS 2,408,926 A * 10/1946 Griffith .......................... 475/245
6,743,138 B2 * 6/2004 Krzesicki et al. ............. 475/230
2004/0127323 A1 7/2004 Wachter et al.
2006/0270511 A1 * 11/2006 Hsieh et al. .................... 475/230
2007/0167272 A1 * 7/2007 Higano et al. ................. 475/248
2009/0270218 A1 * 10/2009 Krude et al. ................... 475/230
2010/0062892 A1 3/2010 Vogel et al.
2010/0179014 A1 7/2010 Hohle et al.
2010/0267511 A1 10/2010 Savoy et al.

FOREIGN PATENT DOCUMENTS

| DE | 814558 | * | 9/1951 |
| DE | 834046 | * | 3/1952 |
| DE | 3926878 A1 | * | 3/1990 |
| DE | 102 34 035 A1 | | 2/2004 |
| DE | 10 2007 005 730 A1 | | 8/2008 |
| DE | 102007005734 B3 | * | 10/2008 |
| GB | 14547 | * | 0/1910 |
| WO | WO 2008/122276 A2 | | 10/2008 |
| WO | WO 2010/118727 A1 | | 10/2010 |

OTHER PUBLICATIONS

International Search Report dated Dec. 20, 2010 (Three (3) pages).
German Search Report including partial English language translation dated Sep. 23, 2010 (Nine (9) pages).

* cited by examiner

*Primary Examiner* — Justin Holmes
(74) *Attorney, Agent, or Firm* — Crowell & Moring LLP

(57) ABSTRACT

A differential, having at least one drive gear, at least two axle gears, at least one compensating gear, and at least one connector element, in which the connector element is subjected to at least one first torque from the drive gear and transmits at least one second torque to at least one of the at least two axle gears. The drive gear is constructed in such a manner that the drive gear at least partially encloses at least one interior space, and the connector element is arranged at least partially inside the interior space enclosed at least partially by the drive gear.

6 Claims, 9 Drawing Sheets

DIFFERENTIAL

CROSS REFERENCE TO RELATED APPLICATIONS

This application is a continuation of international patent application no. PCT/DE2010/000938, filed Aug. 6, 2010 designating the United States of America and published in German on Mar. 10, 2011 as WO 2011/026454 A1, the entire disclosure of which is incorporated herein by reference. Priority is claimed based on Federal Republic of Germany patent application nos. DE 10 2009 039 753.1, filed Sep. 2, 2009, and DE 10 2009 055 867.5, filed Nov. 26, 2009, the entire disclosures of each of which are likewise incorporated herein by reference.

BACKGROUND OF THE INVENTION

The invention relates to a differential, having at least one drive gear, having at least two axle gears, having at least one compensating gear, and having at least one connector element, wherein the connector element receives at least one first torque from the drive gear, and wherein the connector element transmits at least one second torque to at least one of the at least two axle gears, by means of at least one compensating gear.

A differential gear, also called a compensating gear box, or a differential for short, is a special planetary gear which, for example in the case of a vehicle following a curved path, compensates for the different path lengths traveled by the two wheels of one axle, whereby the wheels rotate at different speeds. For this purpose, a connector element receives a drive torque from a drive gear, and thereby is brought into rotation. The drive gear itself is in turn connected to a transmission gearing, and is connected to the actual vehicle motor via this transmission gearing. Two axle gears are arranged in the connector element, and each transmit a torque to an axle segment connected to a wheel, wherein this torque is proportional to the prespecified drive torque. The compensating gear in this case has a torque-relevant connection to the axle gears. In the event that a difference in rotation speed arises between the two wheels, the compensating gear rotates with the effect that one axle rotates at a higher speed. The connector element in the prior art is generally a differential cage, wherein the axle gears and the compensating gears are arranged in the same, and the differential cage is connected on the periphery thereof to the drive gear. One design of a differential is disclosed in US patent publication no. US 2010/0062892 (=WO 2008/122276), for example.

Disadvantages in the designs given by the prior art arise particularly from the differential cage. The latter is commonly difficult to manufacture, leads to large space requirements, and involves high weight.

SUMMARY OF THE INVENTION

It is the object of the invention to provide a differential which overcomes the disadvantages of the prior art with respect to weight and space requirements.

This and other objects have been achieved in accordance with the present invention in that the drive gear is constructed in such a manner that the drive gear at least partially encloses at least one interior space, and in that the connector element is arranged at least partially inside of the interior space which is at least partially enclosed by the drive gear. In the prior art, the connector element is commonly a differential cage which is attached on the periphery of the drive gear, and on the side thereof. However, in the invention, the connector element is inserted into the drive gear itself, and is basically, at least partially, surrounded by the same. As such, the drive gear has at least one open interior space. By way of example, the drive gear is substantially a toothed gear having a body and/or flange surface which is not filled in, meaning that it is open. The assembly of the differential is also simplified by the compact construction of the differential according to the invention. The differential according to the invention also advantageously reduces the manufacturing complexity thereof. In addition, the differential according to the invention provides advantages in oil sealing tightness, meaning that the differential can be filled with oil prior to the actual (final) installation. This is in contrast to the differentials of the prior art, wherein the same can only be filled with oil following the final installation. In addition, no loss of oil occurs when the side shafts are disassembled from the differential according to the invention.

In one embodiment of the invention, the connector element has at least two axle gear pins, and each of the at least two axle gears are arranged rotatably about these axle gear pins, wherein the at least two axle gear pins are arranged along a first imaginary axis of the connector element. Both axle gears therefore rotate about pins which lie in a first imaginary axis of the differential according to the invention. Both of the pins preferably lie on the first imaginary axis in such a manner that they are spaced apart from each other. The first imaginary axis runs generally parallel to the longitudinal axis of the vehicle when the differential is installed.

In one embodiment of the invention, the connector element has at least one compensating gear pin, and the at least one compensating gear is arranged rotatably about this compensating gear pin, and the compensating gear pin is arranged along a second imaginary axis of the connector element, wherein the second imaginary axis of the connector element is substantially perpendicular to the first imaginary axis of the connector element. The compensating gear is likewise arranged on a pin in a rotatable manner, wherein the compensating gear rotates about a second imaginary axis which is perpendicular to the first imaginary axis.

In one embodiment of the invention, at least two compensating gears are included, and the connector element has at least two compensating gear pins, wherein one of the at least two compensating gears are arranged rotatably about each of the compensating gear pins, and the at least two compensating gear pins are arranged along a second imaginary axis of the connector element. As such, two compensating gears have associated pins in this embodiment. In this case as well, both pins preferably are likewise spaced apart from each other on the second imaginary axis.

In one embodiment of the invention, the drive gear rotates substantially within an imaginary plane, and the first imaginary axis extends substantially in the direction of the surface normal of the imaginary plane within which the drive gear rotates. In one embodiment, the second imaginary axis of the connector element lies substantially within the imaginary plane within which the drive gear rotates. And in a further embodiment, the second imaginary axis of the connector element lies substantially within a plane which runs substantially parallel to the imaginary plane within which the drive gear rotates. The drive gear rotates within an imaginary plane, wherein the first imaginary axis extends parallel to this plane. In one embodiment, both of the axle gears and the drive gear therefore rotate about the same axis. The second imaginary axis extends in one embodiment within the plane in which the drive gear rotates; in another embodiment, it is displaced parallel thereto. As such, the connector element either lies in the center of the empty flange surface of the drive gear, or is displaced parallel thereto. In one embodiment, the second imaginary axis coincides particularly with a chord of a substantially disk-shaped drive gear, wherein this chord runs through the center point of a circular plane of the drive gear.

In one embodiment of the invention, the connector element has at least one central region, wherein the at least two axle gear pins and the at least one compensating gear pin extend from this central region in a radiating pattern. In one embodiment, the connector element is particularly constructed as a single piece. In addition, according to the embodiment, the connector element is either solid or has cavities. The shape of the central region in this case is approximately that of a sphere, cube, or rectangle, according to the embodiment.

In one embodiment of the invention, the central region of the connector element is arranged to be substantially symmetric about the center of gravity of the drive gear. As such, mass is evenly distributed.

In one embodiment of the invention, the at least one compensating pin is at least partially, indirectly or directly, connected to an inner surface of the drive gear. By means of the connection, the connector element is coupled to the drive gear, and thereby receives a first torque, meaning that a rotation of the drive gear rotates the connector element with the former. However, this coupling can not only be realized by means of the attachment of the compensating gear pins, but also by means of other connections between the connector element and the drive gear.

In one embodiment, the surface of the at least one compensating gear pin and the surface of the drive gear, said surfaces touching each other, have designs which substantially correspond to each other. In an alternative embodiment, the surfaces do not match each other correspondingly, but rather form cavities between the two.

In one embodiment, the surface of the at least one compensating gear pin and the surface of the drive gear, said surfaces touching each other, have substantially flat designs. This serves, for example, the purpose of easy access for a weld and/or a laser weld.

In one embodiment, the surface of the at least one compensating gear pin and the surface of the drive gear, said surfaces touching each other, have profiles which substantially correspond to each other.

In one embodiment of the invention, the at least one compensating pin is at least partially connected to the inner surface of the drive gear at least via a surface which faces away from the central region of the connector element.

In one embodiment of the invention, the drive gear is constructed substantially in the manner of a toothed wheel. The toothed wheel in this case preferably has a sufficiently large, open interior space for the purpose of receiving the connector element. The drive gear is preferably constructed in the manner of a toothed wheel. The interior space in this case has a substantially circular design.

In one embodiment of the invention, the drive gear has a straight outer toothing, a chamfered outer toothing, or a hypoid outer toothing.

In one embodiment of the invention, at least one bowl sleeve is arranged between the at least two axle gear pins and the axle gear attached to each of the axle gear pins. The bowl sleeve serves to receive forces, and also for example prevents the axle gear and the compensating gear from jamming against each other.

In one embodiment of the invention, at least one plain bearing bush is arranged between the at least two axle gear pins and the axle gear attached to each of the axle gear pins. The plain bearing bush likewise serves to accept forces or torque which could have a negative effect on the bevel gears. If the configuration includes two compensating gears, then at least one plain bearing bush is included between each compensating gear and compensating gear pin.

In one embodiment of the invention, at least one backing is arranged along the at least one compensating gear pin, at least on the side of the compensating gear which faces away from the central region. The backing serves to support the compensating gears in the axial dimension, and therefore provides the engagement of the associated bevel gears with each other. In addition, the backlash between the bevel gears is adjusted in this manner.

In one embodiment of the invention, the backing has at least one recess, wherein the recess has at least one open end, and the recess is constructed and arranged in such a manner that the recess proceeds from the open end and opens on at least one edge of the fixing region where the at least one compensating gear pin is at least partially connected to the inner surface of the drive gear. As such, the backing has a recess on an end face, for example, in the form of a groove, for example, which has an open end and which preferably runs all the way through from the open end to the fixing region where the at least one compensating gear pin is at least partially connected to the inner surface of the drive gear. Each backing particularly has such a recess. As such, the fixing region is particularly accessible, by means of this recess, to produce the fixing. The configuration particularly includes the open end for this reason, wherein the same is optionally closed after the connection is established. In one embodiment, the recess is a groove; in an alternative variant, the recess is a channel in the backing.

In one embodiment, the compensating gear pin is welded to the drive gear on the fixing region, and particularly laser welded.

In one embodiment of the invention, at least one thrust washer is arranged along the at least one compensating gear pin, between the side of the compensating gear which faces away from the central region and the at least one backing. The thrust washers function to provide good glide conditions between each compensating gear and the associated backing positioned behind the same on the same pin.

In one embodiment of the invention, at least one of the at least two axle gears has an outer profile or an inner profile for establishing an attachment to a shaft and/or a gear. By way of example, the configuration includes an outer toothing or an inner toothing for this attachment.

In one embodiment of the invention, the configuration includes at least one housing which encloses at least the connector element and at least a part of the drive gear. However, the housing merely encloses the differential according to the invention, and does not serve to transmit torque as in the prior art. The differential according to the invention is a housing-less differential with respect to its function.

In one embodiment of the invention, the housing has at least one opening via which a torque is transmitted to the drive gear.

In one embodiment of the invention, the configuration includes at least one tapered roller bearing. The roller bearings absorb forces and function to guide the axle gears.

In one embodiment, the configuration includes at least one rolling bearing. The rolling bearing is constructed, by way of example, as a ball bearing. In addition, the rolling bearing is located between the axle gears and each axle gear pin, for example.

In one embodiment of the invention, the connector element is a single piece. The connector element is, for example, a single-piece forged part. In an alternative variant, the connector element is composed of multiple parts. In this variant, the connector element is constructed in multiple parts, and consists of a plurality of parts, and at least two parts, which are connected to each other and fit to each other. In one embodiment, the connector element is a single part; in another embodiment, the connector element is made of multiple parts.

In one embodiment of the invention, the configuration includes at least four compensating gears, the connector element has at least four compensating gear pins, wherein each of the at least four compensating gears are arranged rotatably about one of these four compensating gear pins, two of the at least two compensating gear pins are arranged along the second imaginary axis of the connector element, and two of the at least two compensating gear pins are arranged along an imaginary axis which is substantially perpendicular to the first imaginary axis and to the second imaginary axis of the connector element. As such, the fastening pins named above also serve to carry the compensating gears in this embodiment. As an alternative, however, additional fastening pins can also be included.

In one embodiment, at least one axle gear is constructed substantially as a bevel gear.

In one embodiment, at least one axle gear is constructed substantially as a crown gear. A crown gear and corresponding spur gear transmit the forces and/or torque. The advantages of crown gears are that it is possible to leave out the adjustment of the contact pattern during assembly of the differential, and that the contact pattern is not subject to any influences arising from varying loads.

In one embodiment, at least one axle gear is constructed substantially as a spur gear.

In one embodiment, at least one compensating gear is constructed substantially as a bevel gear.

In one embodiment, at least one compensating gear is constructed substantially as a spur gear.

In one embodiment, at least one compensating gear is constructed substantially as a crown gear.

The embodiments of the axle gears and the compensating gears in this case are each intended to be selected to fit each other.

In the following, descriptions of several embodiments of the invention are set forth. One description of a differential according to the invention is as follows:

A differential, having at least one drive gear, having at least two axle gears, having at least one compensating gear, and having at least one connector element, wherein the connector element receives at least one first torque at least from the drive gear, and wherein the connector element transmits at least a second torque at least to one of the at least two axle gears. The differential is characterized in that the drive gear is constructed in such a manner that the drive gear at least partially encloses at least one interior space, and in that the connector element is arranged at least partially inside of the interior space which is at least partially enclosed by the drive gear.

A first embodiment of the differential is characterized in that the connector element has at least two axle gear pins, and each of the at least two axle gears are arranged rotatably about these axle gear pins, wherein the at least two axle gear pins are arranged along a first imaginary axis of the connector element.

A second embodiment of the differential, optionally according to the first embodiment, is characterized in that the connector element has at least one compensating gear pin, and the at least one compensating gear is arranged rotatably about this compensating gear pin, and in that the compensating gear pin is arranged along a second imaginary axis of the connector element, wherein the second imaginary axis of the connector element is substantially perpendicular to the first imaginary axis of the connector element.

A third embodiment of the differential, according to the second embodiment, is characterized in that at least two compensating gears are included, and the connector element has at least two compensating gear pins, wherein one of the at least two compensating gears is arranged rotatably about each of the compensating gear pins, and the at least two compensating gear pins are arranged along a second imaginary axis of the connector element.

A fourth embodiment of the differential, according to the second or third embodiment, is characterized in that the drive gear rotates substantially within an imaginary plane, and the first imaginary axis extends substantially in the direction of the surface normal of the imaginary plane within which the drive gear rotates.

A fifth embodiment of the differential, according to the fourth embodiment, is characterized in that the second imaginary axis of the connector element lies substantially within the imaginary plane within which the drive gear rotates.

A sixth embodiment of the differential, according to the fourth or fifth embodiment, is characterized in that the second imaginary axis of the connector element lies substantially within a plane which runs substantially parallel to the imaginary plane within which the drive gear rotates.

A seventh embodiment of the differential, according to one of the embodiments between the first and the sixth embodiment, is characterized in that the connector element has at least one central region, wherein the at least two axle gear pins and the at least one compensating gear pin extend from this central region in a radiating pattern.

An eighth embodiment of the differential, according to the seventh embodiment, is characterized in that the central region of the connector element is arranged to be substantially symmetric about the center of gravity of the drive gear.

A ninth embodiment of the differential, according to one of the embodiments between the first and the eighth embodiment, is characterized in that the at least one compensating pin is at least partially, indirectly or directly, connected to an inner surface of the drive gear.

A tenth embodiment of the differential, according to the ninth embodiment, is characterized in that the at least one compensating pin is at least partially connected to the inner surface of the drive gear at least via a surface which faces away from the central region of the connector element.

An eleventh embodiment of the differential, according to the tenth embodiment, is characterized in that the surface of the at least one compensating gear pin and the surface of the drive gear, said surfaces touching each other, have designs which substantially correspond to each other.

A twelfth embodiment of the differential, according to the eleventh embodiment, is characterized in that the surface of the at least one compensating gear pin and the surface of the drive gear, said surfaces touching each other, have substantially flat designs.

A thirteenth embodiment of the differential, according to the eleventh embodiment, is characterized in that the surface of the at least one compensating gear pin and the surface of the drive gear, said surfaces touching each other, have profiles which substantially correspond to each other.

A fourteenth embodiment of the differential, optionally according to one of the embodiments between the first and the thirteenth embodiment, is characterized in that the drive gear is constructed substantially in the manner of a toothed wheel.

A fifteenth embodiment of the differential, according to the fourteenth embodiment, is characterized in that the drive gear has a straight outer toothing, a chamfered outer toothing, or a hypoid outer toothing.

A sixteenth embodiment of the differential, according to one of the embodiments between the first and the fifteenth embodiment, is characterized in that at least one bowl sleeve is arranged between the at least two axle gear pins and the axle gear attached to each of the axle gear pins.

A seventeenth embodiment of the differential, according to one of the embodiments between the first and the sixteenth embodiment, is characterized in that at least one plain bearing bush is arranged between the at least two axle gear pins and the axle gear attached to each of the axle gear pins.

An eighteenth embodiment of the differential, according to one of the embodiments between the first and the seventeenth embodiment, is characterized in that at least one backing is arranged along the at least one compensating gear pin, at least on the side of the compensating gear which faces away from the central region.

A nineteenth embodiment of the differential, according to the eighteenth embodiment, is characterized in that the backing has at least one recess, wherein the recess has at least one open end, and the recess is constructed and arranged in such a manner that the recess proceeds from the open end and opens on at least one edge of the fixing region where the at least one compensating gear pin is at least partially connected to the inner surface of the drive gear.

A twentieth embodiment of the differential, according to the nineteenth embodiment, is characterized in that the compensating gear pin is welded to the drive gear on the fixing region, and particularly laser welded.

A twenty-first embodiment of the differential, according to one of the embodiments between the eighteenth and the twentieth embodiment, is characterized in that at least one thrust washer is arranged along the at least one compensating gear pin, between the side of the compensating gear which faces away from the central region and the at least one backing.

A twenty-second embodiment of the differential, optionally according to one of the embodiments between the first and the twentieth embodiment, is characterized in that at least one of the at least two axle gears has an outer profile or an inner profile for establishing an attachment to a shaft and/or a gear.

A twenty-third embodiment of the differential, optionally according to one of the embodiments between the first and the twenty-second embodiment, is characterized in that the configuration includes at least one housing which encloses at least the connector element and at least a part of the drive gear.

A twenty-fourth embodiment of the differential, according to the twenty-third embodiment, is characterized in that the housing has at least one opening via which a torque is transmitted to the drive gear.

A twenty-fifth embodiment of the differential, optionally according to one of the embodiments between the first and the twenty-fourth embodiment, is characterized in that at least one tapered roller bearing is included.

A twenty-sixth embodiment of the differential, optionally according to one of the embodiments between the first and the twenty-fifth embodiment, is characterized in that at least one rolling bearing is provided.

A twenty-seventh embodiment of the differential, optionally according to one of the embodiments between the first and the twenty-sixth embodiment, is characterized in that the connector element is constructed as a single part. As such, the connector element consists of one piece.

A twenty-eighth embodiment of the differential, optionally according to one of the embodiments between the first and the twenty-sixth embodiment, is characterized in that the connector element is constructed with multiple parts.

A twenty-ninth embodiment of the differential, optionally according to one of the embodiments between the second and the twenty-eighth embodiment, is characterized in that the configuration includes at least four compensating gears, the connector element has at least four compensating gear pins, wherein each of the at least four compensating gears are arranged rotatably about one of these four compensating gear pins, two of the at least two compensating gear pins are arranged along the second imaginary axis of the connector element, and in that two of the at least two compensating gear pins are arranged along an imaginary axis which is substantially perpendicular to the first imaginary axis and to the second imaginary axis of the connector element.

A thirtieth embodiment of the differential, optionally according to one of the embodiments between the first and the twenty-ninth embodiment, is characterized in that at least one axle gear is constructed substantially as a bevel gear.

A thirty-first embodiment of the differential, optionally according to one of the embodiments between the first and the thirtieth embodiment, is characterized in that at least one axle gear is constructed substantially as a crown gear.

A thirty-second embodiment of the differential, optionally according to one of the embodiments between the first and the thirty-first embodiment, is characterized in that at least one axle gear is constructed substantially as a spur gear.

A thirty-third embodiment of the differential, optionally according to one of the embodiments between the first and the thirty-second embodiment, is characterized in that at least one compensating gear is constructed substantially as a bevel gear.

A thirty-fourth embodiment of the differential, optionally according to one of the embodiments between the first and the thirty-third embodiment, is characterized in that at least one compensating gear is constructed substantially as a spur gear.

A thirty-fifth embodiment of the differential, optionally according to one of the embodiments between the first and the thirty-fourth embodiment, is characterized in that at least one compensating gear is constructed substantially as a crown gear.

The foregoing descriptions of representative embodiments is not exclusive, and it is intended that the invention also include additional combinations of the individual features of the various embodiments of the invention described above.

BRIEF DESCRIPTION OF THE DRAWINGS

The invention will be described in further detail hereinafter with reference to several illustrative embodiments depicted in the accompanying drawing figures, in which.

DETAILED DESCRIPTION OF ILLUSTRATIVE EMBODIMENTS

Figure 1:
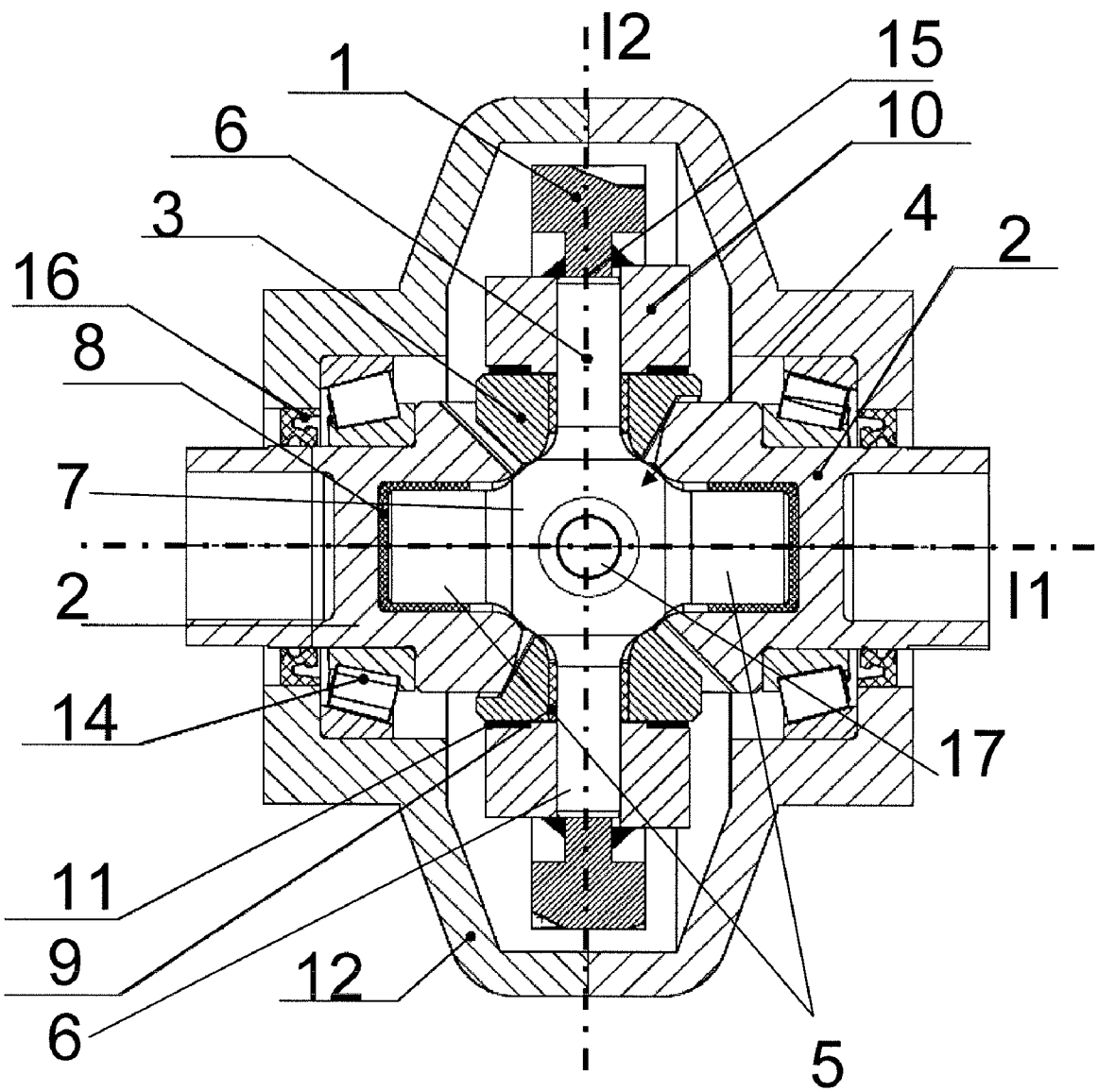
FIG. 1 shows a cutaway view of a first variant of the differential according to the invention.
Figure 2:
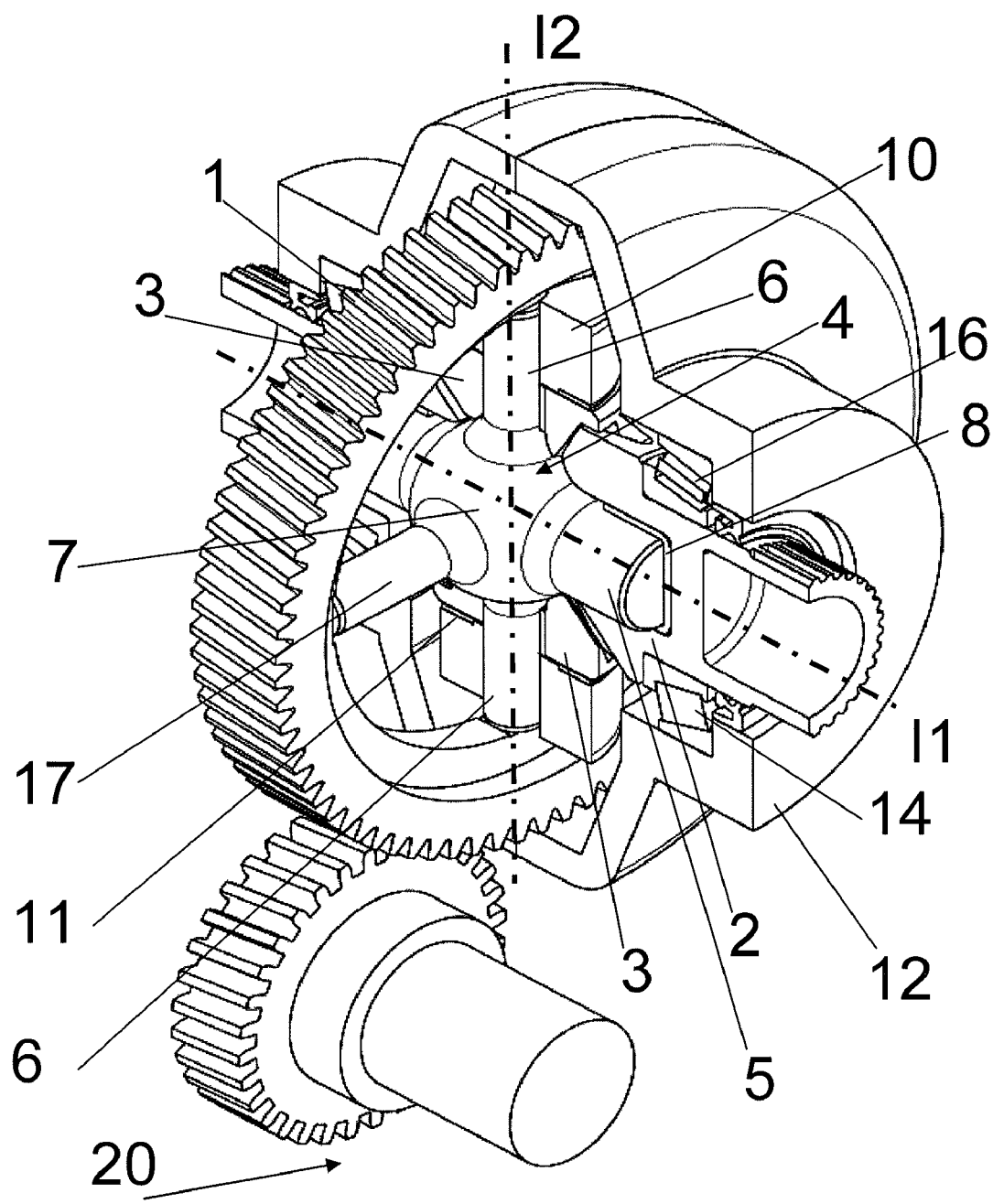
FIG. 2 shows a spatial illustration of the variant in FIG. 1.

A first variant of the differential according to the invention is shown in the cutaway view in FIG. 1 as well as the associated spatial illustration in FIG. 2. The connector element 4 is arranged inside the housing 12, substantially in the center thereof, and is constructed as a differential cage in the prior art. In this embodiment, it has the shape of a substantially solid central region 7, wherein a total of six pins extend from the connector element 4 in this embodiment (see FIG. 2). In this case, these are two axle gear pins 5, two compensating gear pins 6, and two fastening pins 17. The pins 5, 6, 17 in this case are substantially cylindrical in design, wherein the diameter of the axle gear pins 5 in the embodiment shown here is larger than the other two types of pins 6, 17.

The connecting element 4, which is consequently star-shaped in this embodiment, and which can also be characterized as a planetary carrier in this functional context, is connected to the drive gear 1 via the two compensating gear pins 6 and the two fastening pins 17. The drive gear 1 in this case is a toothed gear and/or an annular gear, meaning that a toothing is found on the outside thereof, and the inner/flange region of the drive gear 1 is empty or similarly free of material, such that sufficient space is created for the remaining components of the differential according to the invention. In this case, the drive gear 1 has a particularly chamfered outer toothing.

As can be seen in FIG. 2, the drive gear 1 is driven via the drive 20 to rotate about the first imaginary axis 11, meaning that the drive gear 1 receives a first torque. The drive 20 in this case is indirectly connected to the motor (not illustrated) of the vehicle, wherein the differential is installed in said vehicle. The drive gear 1 itself transmits a second torque, the same being proportional to the first torque, to the (not illustrated) gears attached at the side, via the rotation of the axle gears 2 which each rotate about the assigned axle gear pins 5. Outer teeth are attached in this case on the axle gears 2 for the purpose of connecting the differential to the vehicle axle. As such, the axle gears 2 are shaped as bevel gears in this embodiment, wherein a substantially cylindrical unit is attached on the base surface of each bevel gear and comprises the outer teeth in this case. The axle gears 2 are each arranged rotatably on an axle gear pin 5 via a bowl sleeve 8 (see FIG. 1 and FIG. 2), wherein the gliding surface thereof is arranged on the outside, meaning facing the axle gears 2. In addition, two tapered roller bearings 14 are each included between the axle gears 2 and the housing 12, and function to provide axial support along the first imaginary axis 11. In addition, the housing 12 is sealed laterally on each side of the gears, by means of a radial shaft seal 16 in the form of a radial shaft sealing ring on each side. This makes it possible, among other things, to construct the differential according to the invention as a substantially completely closed unit. For this purpose, the opening which provides the connection to the drive must be accordingly constructed. This closed design also makes it possible to fill the differential with oil prior to the installation of the same.

Two compensating gear pins 6 are included along the second imaginary axis 12 for two compensating gears 3, wherein the second imaginary axis 12 is perpendicular to the first imaginary axis 11. The axle gears 2 and the compensating gears 3 are constructed in such a manner and are arranged with respect to each other such that they engage with each other via their teeth. In this case, the normal functionality of a differential is carried out by means of the compensating gears 3. By means of the two compensating gears 3, the connector element 4 transmits the second torque to the axle gears 2. The compensating gears 3 are arranged rotatably about the compensating gear pins 6 via plain bearing bushes 9. The compensating gear pins 6 are each in turn connected to the drive gear 1 via a fixing region 15, for example by means of welding or laser welding, and therefore rotate with the drive gear 1. In addition, one backing 10 is included in each position facing the inner surface of the drive gear 1, and the backing 10 serves to support the compensating gears 3 in the axial dimension, and thereby prevents a movement of the same away from the center. The different height of the backings 10, which can particularly be seen in FIG. 1, serves on the one hand to simplify installation, and on the other hand to support the backings 10 laterally. Thrust washers 11 are included between the backings 10 and the associated compensating gears 3, allowing gliding between the compensating gear 3 and the backing 10.

In FIG. 2, a fastening pin 17 can particularly be recognized, and this serves to fix the connector element 4 to the inner surface of the drive gear 1.

The differential according to the invention therefore differs from the prior art at least in that the construction—generally characterized in this case as the connector element—for the purpose of transmitting the torque to the wheels of a vehicle axle and for the purpose of reacting to a difference in torque and/or a difference in speed between the two wheels, is arranged inside the drive gear, and not fixed to the side thereof as in the prior art. As such, the differential requires less space, and the design also enables the differential to have a lower weight. The large difference with respect to the prior art consists in the fact that no housing is provided for the function of the differential.

Figure 3:
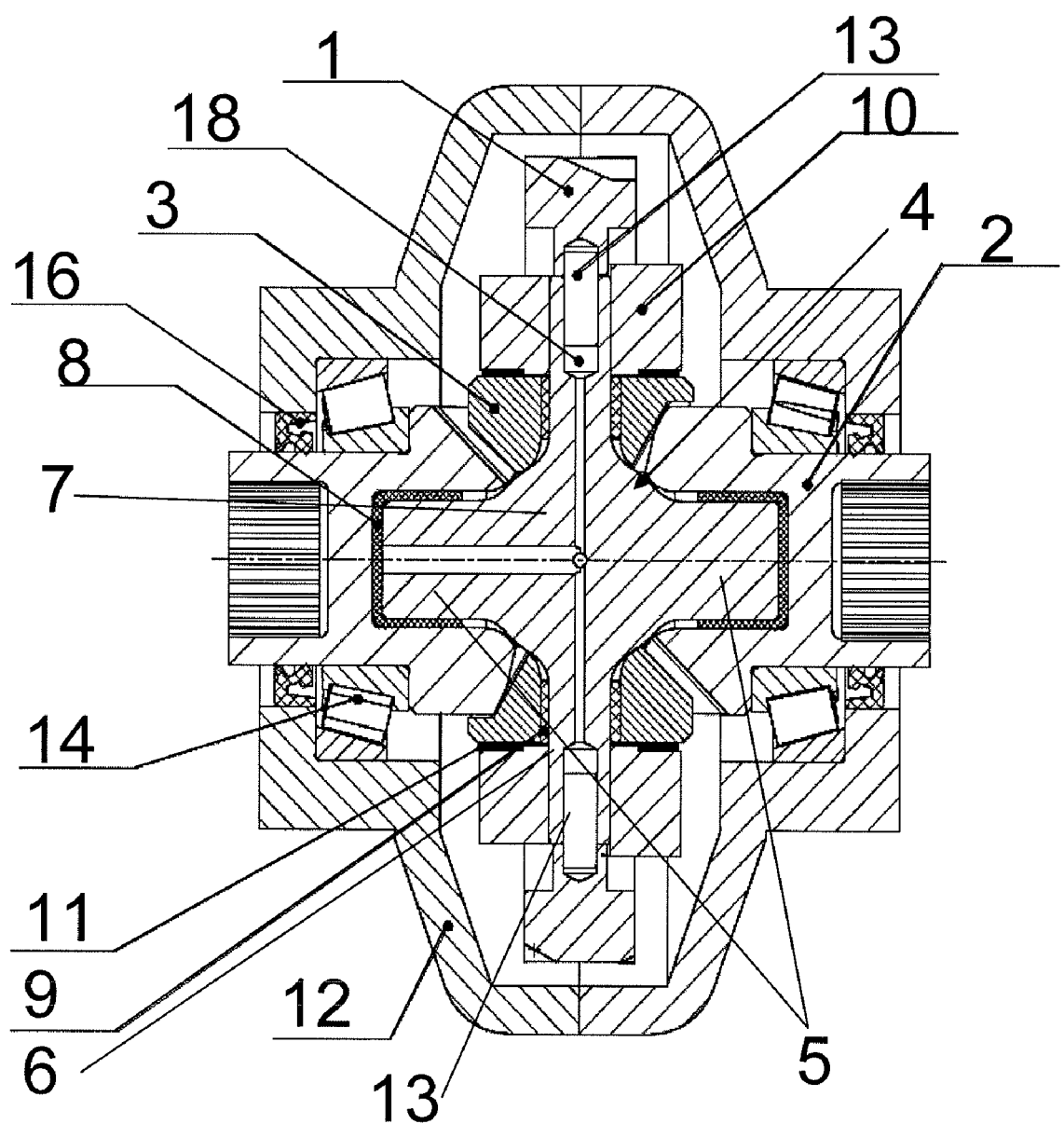
FIG. 3 shows a cutaway view of a second variant of the differential according to the invention.
Figure 4:
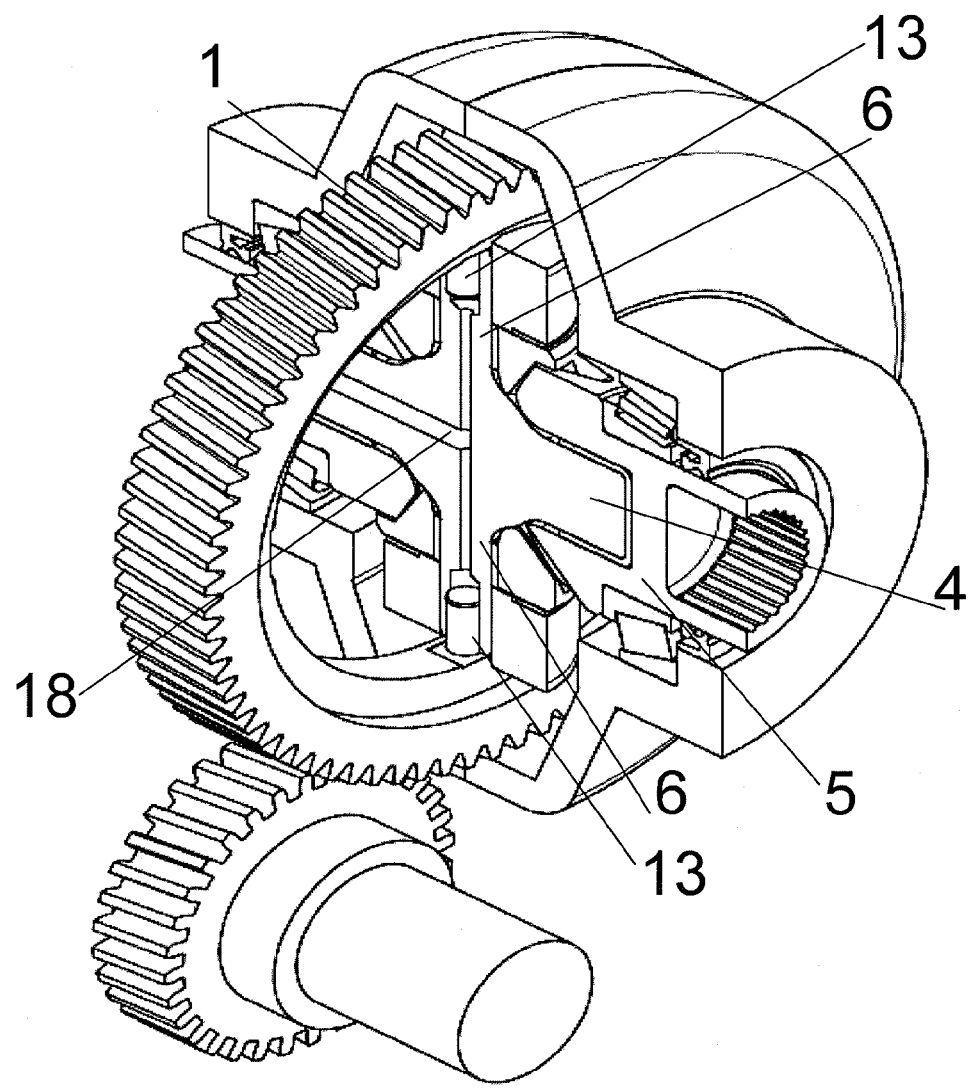
FIG. 4 shows a spatial illustration of the variant in FIG. 3.

In FIG. 3, a cutaway view of a second variant of the differential according to the invention is illustrated. FIG. 4 shows an associated truncated spatial illustration of the same. This particularly shows an alternative embodiment of the fixation of the connector element 4 to the drive gear 1. The connection is realized via the fixing pins 13, which partially stick into the compensating gear pins 6 and/or into the fastening pins 17, and partially into recesses of the drive gear 1. For the purpose of inserting the fixing pins 13 into each of the recesses of the drive gear 1 following assembly—meaning after the components are fit onto the [compensating gear-, fastening] pins, and after insertion into the drive gear 1—a hydraulic channel 18 is included which opens in one of the axle gear pins 5. The hydraulic channel 18—or as an alternative, a pneumatic channel—leads in the direction of each of the pins via which the fixing of the connector element 4 to the drive gear 1 is realized. Particularly in FIG. 4, the recess in the connector element 4 can be seen in the drive gear 1, wherein the fixing pin 13 is inserted into said recess. An oil is introduced into this channel 18, for example, wherein the pins 13 are pushed outward via the oil upon pressure being applied, and are therefore pushed into the recesses of the drive gear 1. However, other possibilities exist, including the use of springs, by way of example.

Moreover, the variants in FIGS. 3 and 4 differ from the first variants in FIGS. 1 and 2 described above in that the two axle gear pins 5 each have an inner toothing for the purpose of connecting to the side shafts leading to the wheels.

Figure 5:
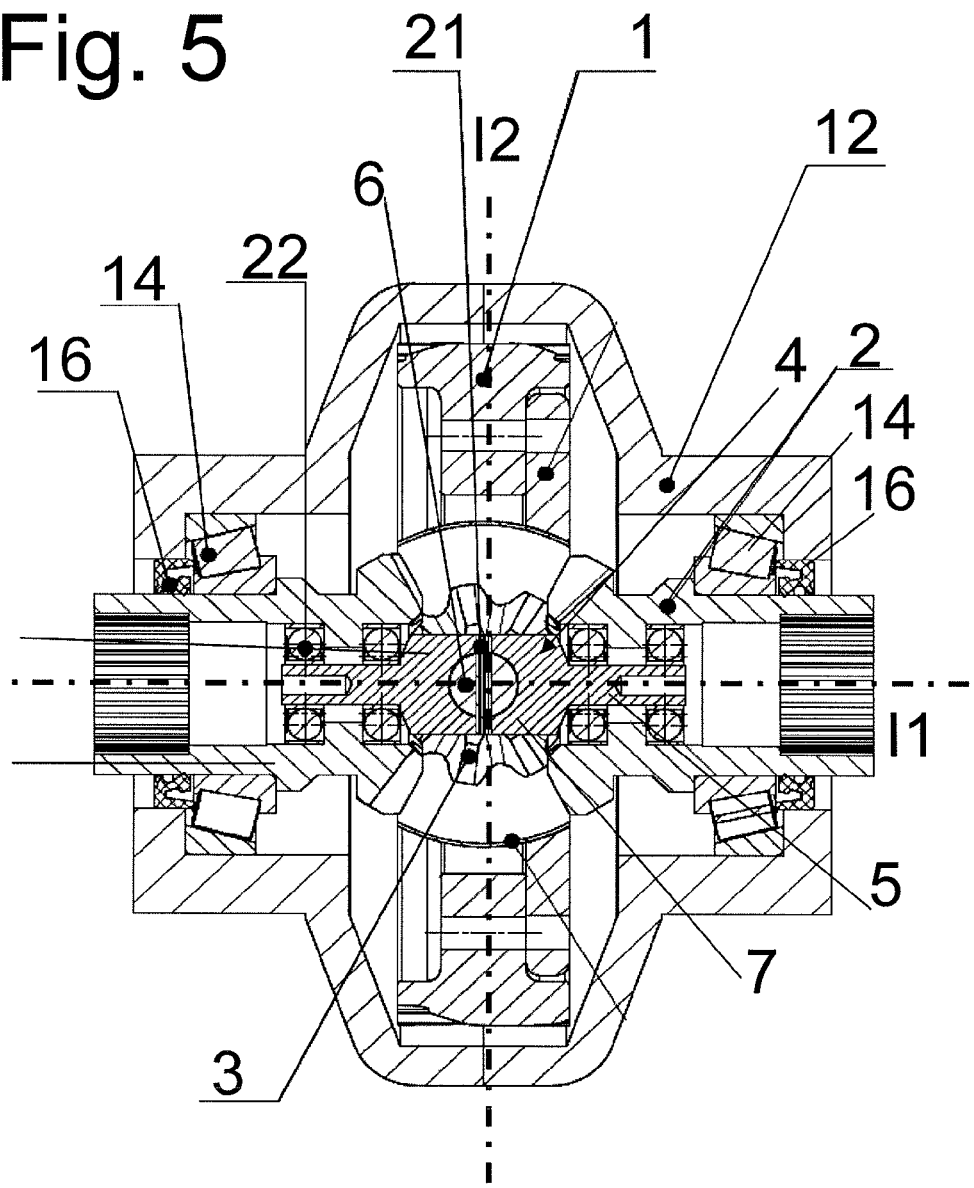
FIG. 5 shows a cutaway view of a third variant of the differential according to the invention.
Figure 6:
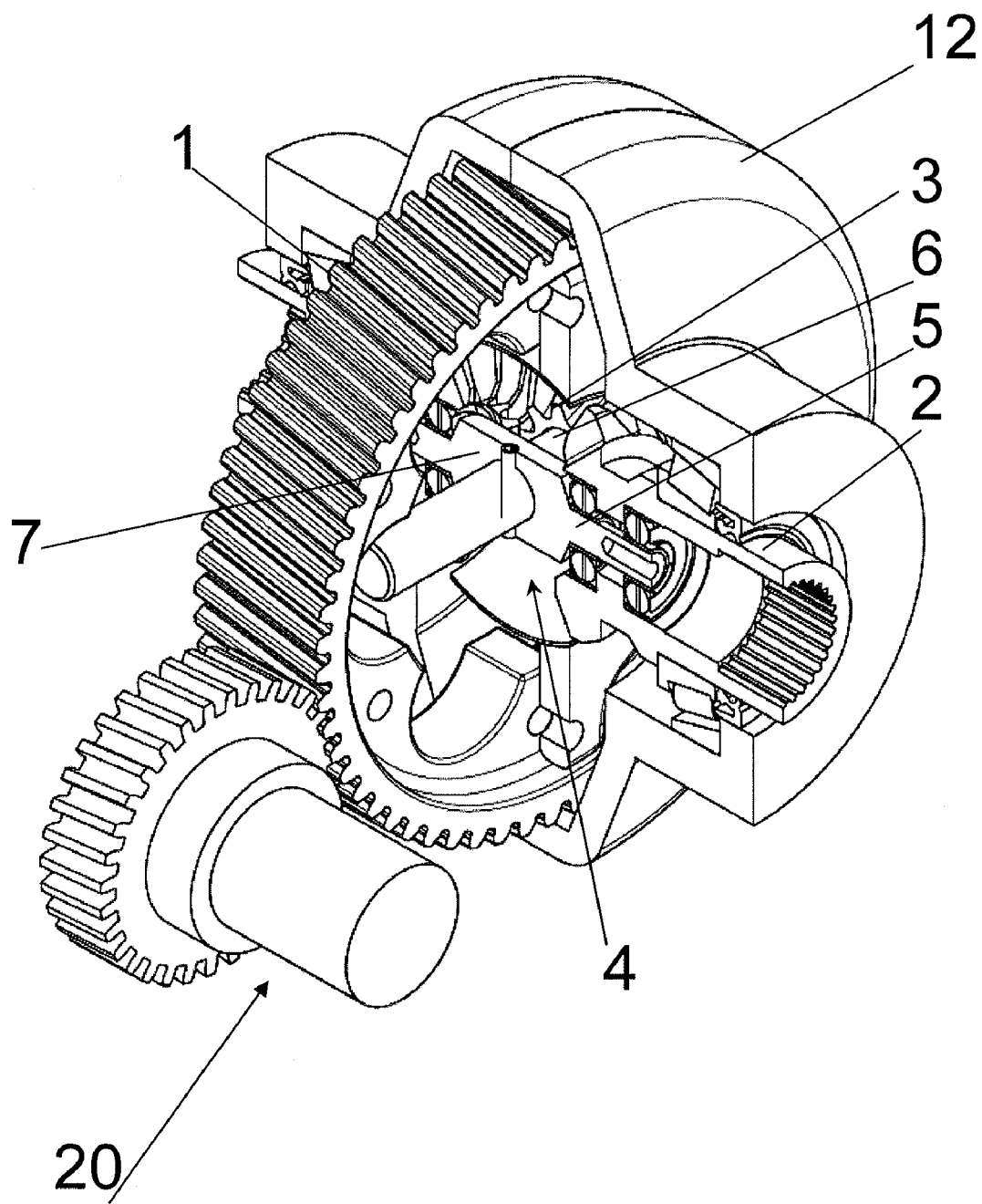
FIG. 6 shows a spatial illustration of the variant in FIG. 5.

In FIGS. 5 and 6, a cutaway view and a partially truncated spatial illustration of a third variant of the differential according to the invention are illustrated. The compensating gear 3 in FIG. 6 is located behind the axle gears 2 in the illustration.

While in the previous embodiments, the connector element 4 is a single-piece component, and for example a forged part, in the variants shown in FIGS. 5 and 6, it is constructed as a two-piece component. Both halves of the connector element 4 are connected to each other via a mechanical coupling, for example via a bolted fitting 21 or pinned fitting, or the like. A further difference, which is nevertheless independent of the two-piece construction of the connector element 4, is that the axle gear pins 5 are each surrounded by a rolling bearing, for example by a ball bearing 22, wherein the axle gears 2 are arranged on these rolling bearings. The axle gears 2 in turn are secured on the axle gear pins 5 via a bolt (not shown here) (the recesses for the bolts can be seen on each of the ends of the pins 5).

Figure 7:
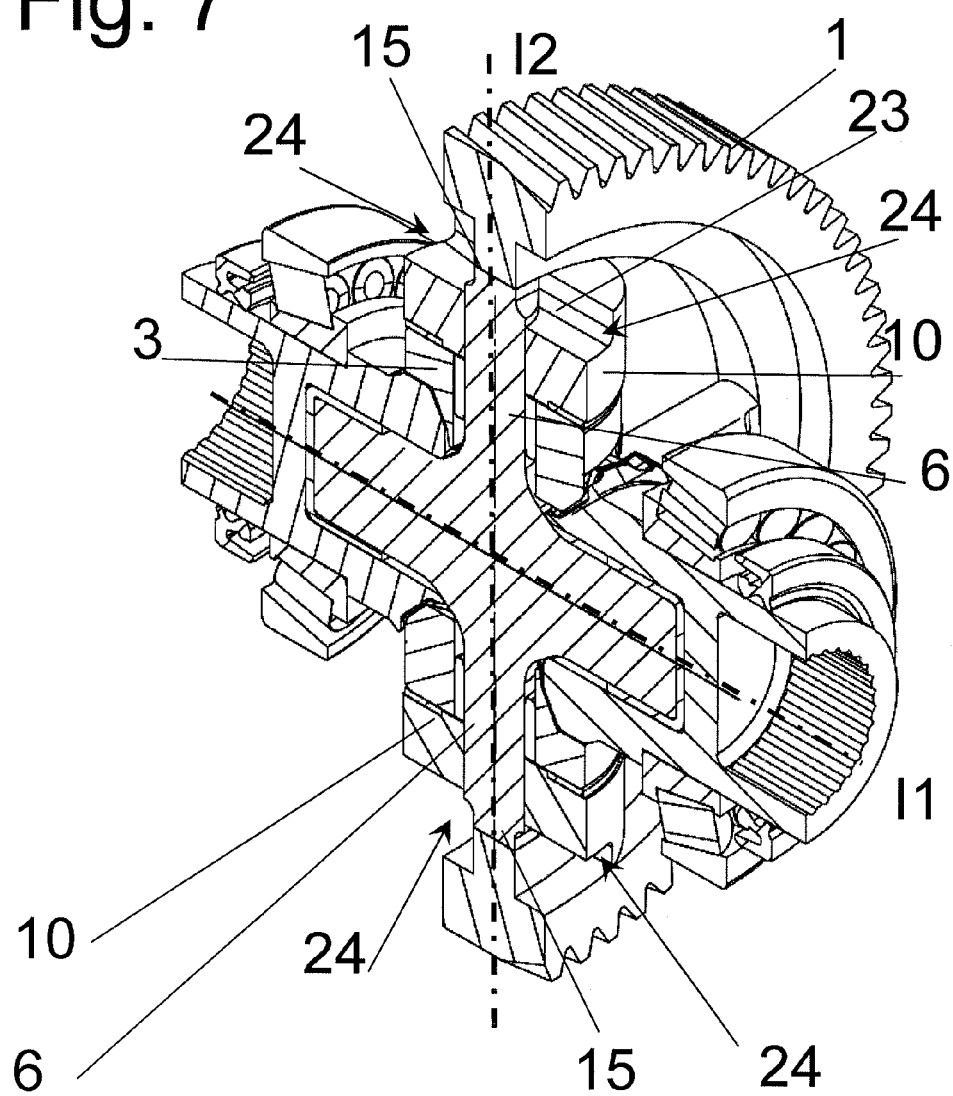
FIG. 7 shows a spatial illustration of a further variant of the differential according to the invention.

Both of the backings 10 of the differential in FIG. 7 each have a recess 23 on an end face, and the recess 23 is constructed as a groove. In an alternative variant which is not shown, at least one recess 23 is constructed as a channel, the open end 24 of which opens on a side of a backing 10, wherein said channel extends through to the fixing region 15. Due to the design of the recess 23 as a groove which passes fully through the backing 10, two open ends 24 are consequently created for each of the recesses 23. The compensating gear pins 6 each extend through the backings 10 and open via a fixing region 15 on the inner side of the drive gear 1. At the same time, the compensating gear pins 6 also extend through the recesses 23, wherein the fixing regions 15 are accessible from the open ends 24, due to the design of the recesses 23. As such, the compensating gear pins 6 can particularly be connected to the inner side of the drive gear 1.

In addition, it can be seen that the inner side of the drive gear 1 and the compensating gear pins 6 have a flat design, at least in the fixing regions 15. Consequently, a connection by means of, for example, welding or laser welding is simplified in this way. It is particularly also optionally possible to perform a laser welding with two laser beams, preferably at the same time, from both sides.

In the illustrations of FIG. 1 to FIG. 7, the axle gears 2 and the compensating gears 3 are each bevel gears which engage functionally with each other.

Figure 8:
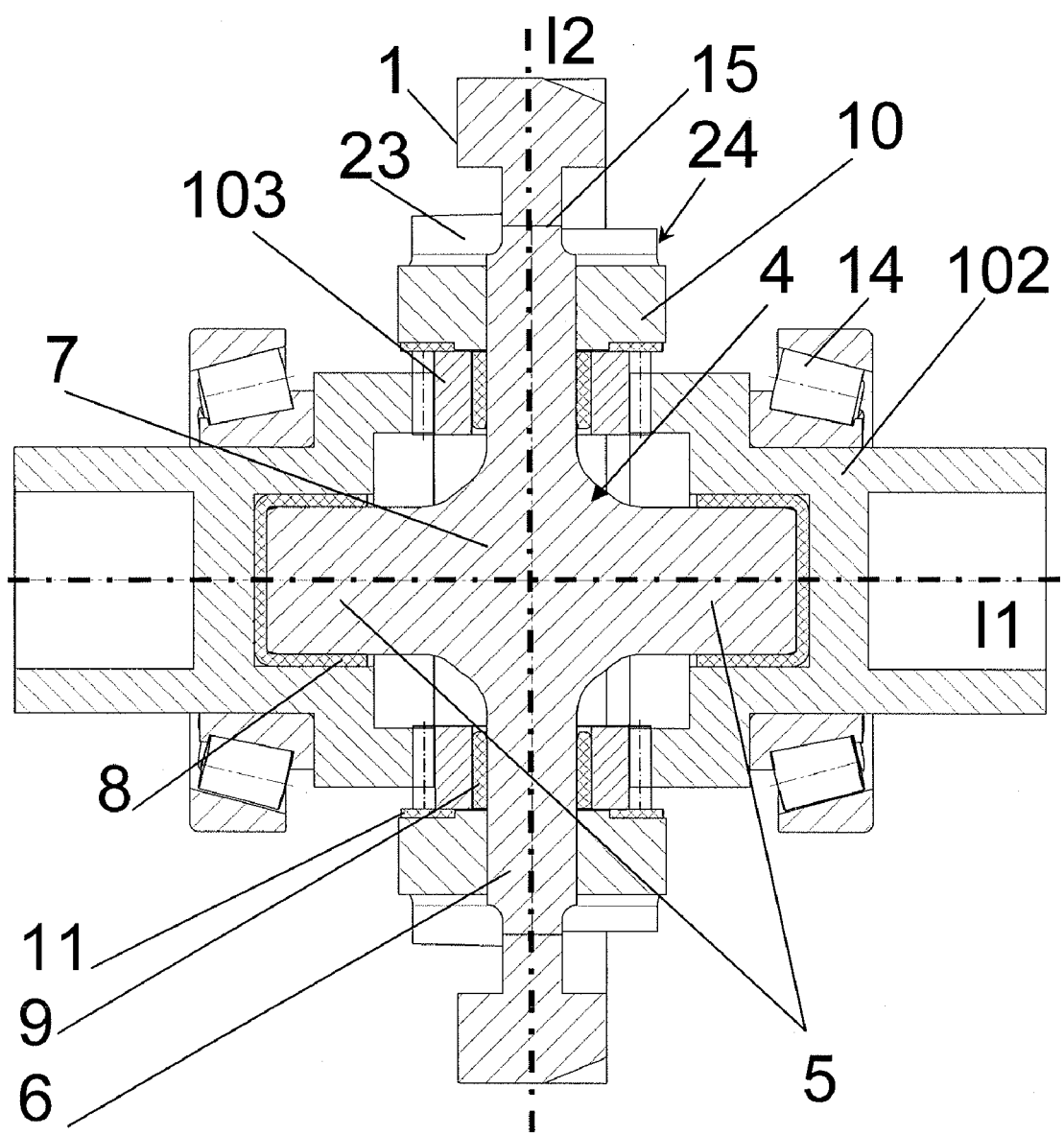
FIG. 8 shows a cutaway view of a further variant of the differential according to the invention.

In FIG. 8, the axle gears 102 are constructed as crown gears, and the compensating gears 103 are constructed as spur gears. The single-piece connector element 4 is located in the center, and two axle gear pins 5 and the two compensating gear pins 6 which can be seen here extend outward in a radiating pattern from the solid central region 7 of the connector element 4. In one embodiment, an additional two compensating gear pins 6, and/or in an alternative embodiment two fastening pins as illustrated in FIG. 2 for example, are located in the direction perpendicular to the first imaginary axis 11 and the second imaginary axis 12. The connector element 4 is connected to the drive wheel 1 via the ends of the compensating gear pins 6 and/or, according to the embodiment, via the ends of the fastening gear pins. The drive gear 1 applies a first torque to the connector element 4. As can be seen here, the ends of the compensating gear pins 6 are connected to the inner side of the drive gear 1, the same being constructed as a toothed wheel, via a fixing region 15, by means of welding or laser welding, for example. A bowl sleeve 8 and an axle gear 102 constructed as a crown gear and having a tapered roller bearing 14 are located on the respective ends of the axle gear pins 5 along the first imaginary axis 11. The axle gears 102 in this case are in functional engagement with the two compensating gears 103, the same constructed as spur gears and being located along the second imaginary axis 12 on the compensating gear pins 6, wherein a plain bearing bush 9 is arranged between each of the compensating gear pins 6 and the compensating gears 103. As in the first construction of the differential, a thrust washer 11 and a backing 10 are located between each of the inner sides of the drive gear 1 and the compensating gears 103. The backing 10 is constructed in this case in such a manner that it has a recess 23 constructed as a groove, with two open ends 24, such that the compensating gear pins 6 which pass through the backing 10 can be connected to the inner side of the drive gear 1, and particularly are weldable and/or laser weldable. On this point, see also the previous embodiments.

Figure 9:
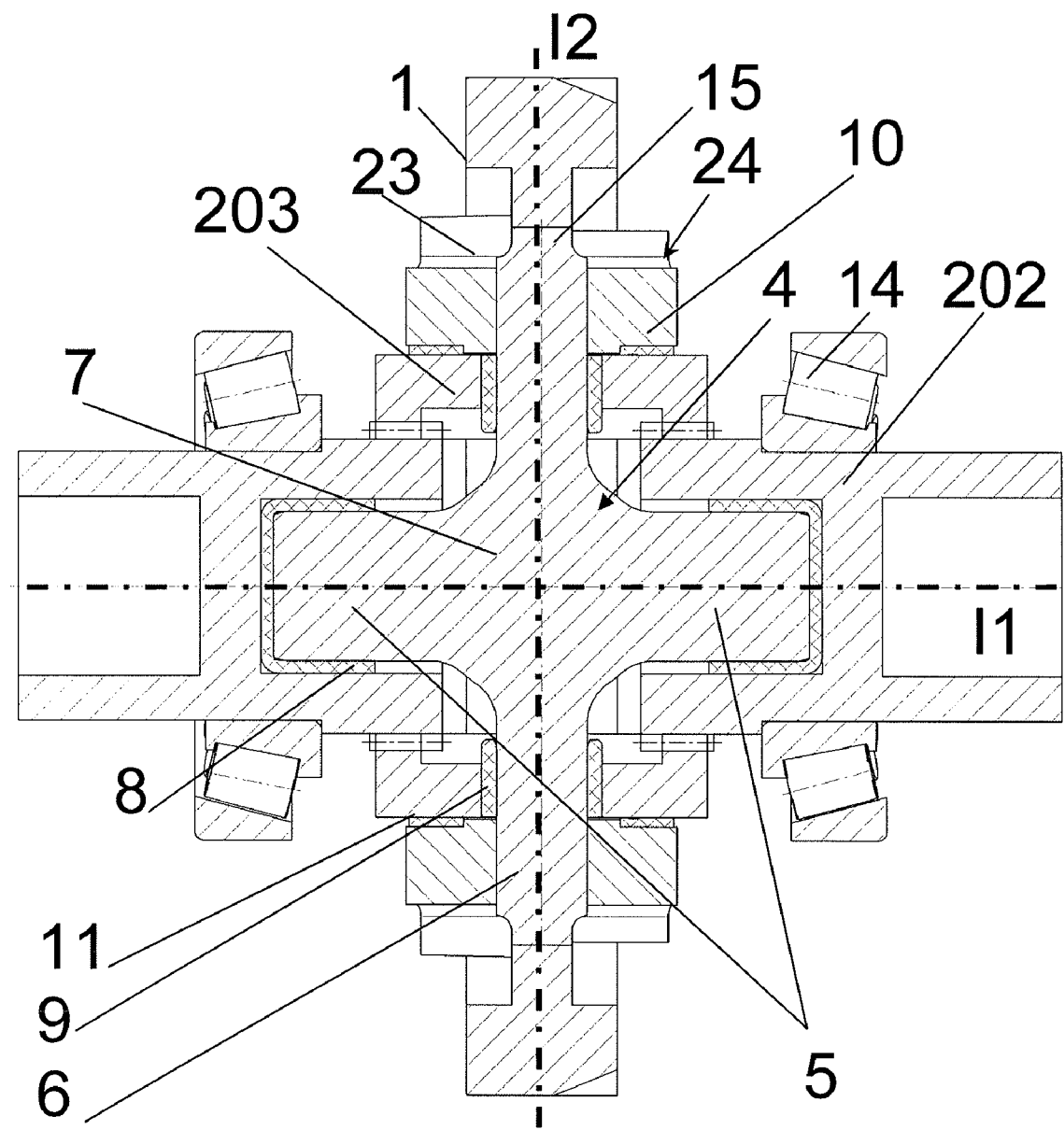
FIG. 9 shows a cutaway view of an additional variant of the differential according to the invention.

The difference between FIG. 8 and FIG. 9 is that in the variant in FIG. 9, the axle gears 202 are constructed as spur gears, and the compensating gears 203 are constructed as crown gears.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A differential comprising at least one drive gear, at least two axle gears, at least one compensating gear, and at least one connector element, wherein the connector element receives at least one first torque at least from the drive gear and transmits at least one second torque to at least one of the at least two axle gears;

the drive gear is constructed in such a manner that the drive gear at least partially encloses at least one interior space;

the connector element is arranged at least partially inside the interior space which is at least partially enclosed by the drive gear;

the connector element comprises at least two axle gear pins, and a respective one of the at least two axle gears is arranged to rotate about each of these axle gear pins;

the at least two axle gear pins are arranged along a first imaginary axis of the connector element;

the connector element has at least one compensating gear pin, and the at least one compensating gear is arranged rotatably about this compensating gear pin;

the compensating gear pins are arranged along a second imaginary axis of the connector element, which second imaginary axis of the connector element is substantially perpendicular to the first imaginary axis of the connector element;

the connector element comprises at least one central region, and the at least two axle gear pins and the at least one compensating gear pin extend from this central region in a radiating pattern;

the at least one compensating pin is at least partially, indirectly or directly, connected to an inner surface of the drive gear, the drive gear is constructed substantially in the manner of a toothed wheel, at least one backing is arranged along the at least one compensating gear pin, at least on the side of the compensating gear which faces away from the central region, the backing is provided with at least one recess having at least one open end, and said recess is constructed and arranged in such a manner that the recess proceeds from the open end and opens on at least one edge of the fixing region where the at least one compensating gear pin is at least partially connected to the inner surface of the drive gear, and the at least one recess of the backing is on an end face of the backing facing away from the central region.

2. A differential according to claim 1, wherein the connector element is constructed as a single piece.

3. A differential according to claim 1, wherein the central region of the connector element is arranged to be substantially symmetrical about the center of gravity of the drive gear.

4. A differential according to claim 1, wherein:
- at least one axle gear is constructed substantially as a bevel gear, and
- at least one compensating gear is constructed substantially as a bevel gear.

5. A differential according to claim 1, wherein
- at least one axle gear is constructed substantially as a crown gear, and
- at least one compensating gear is constructed substantially as a spur gear.

6. A differential according to claim 1, wherein
- at least one axle gear is constructed substantially as a spur gear, and
- at least one compensating gear is constructed substantially as a crown gear.

* * * * *